May 27, 1947.  M. T. SWISHER  2,421,301
SINGLE PHASE ALTERNATING CURRENT SYNCHRONOUS MOTOR
Filed March 15, 1944   2 Sheets-Sheet 1
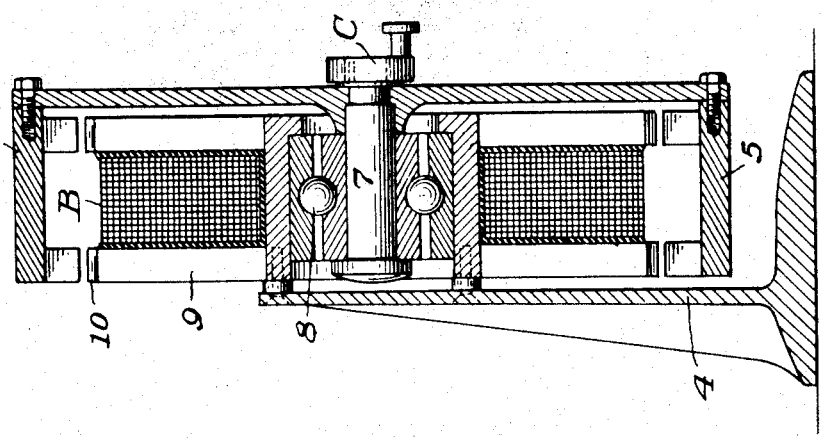
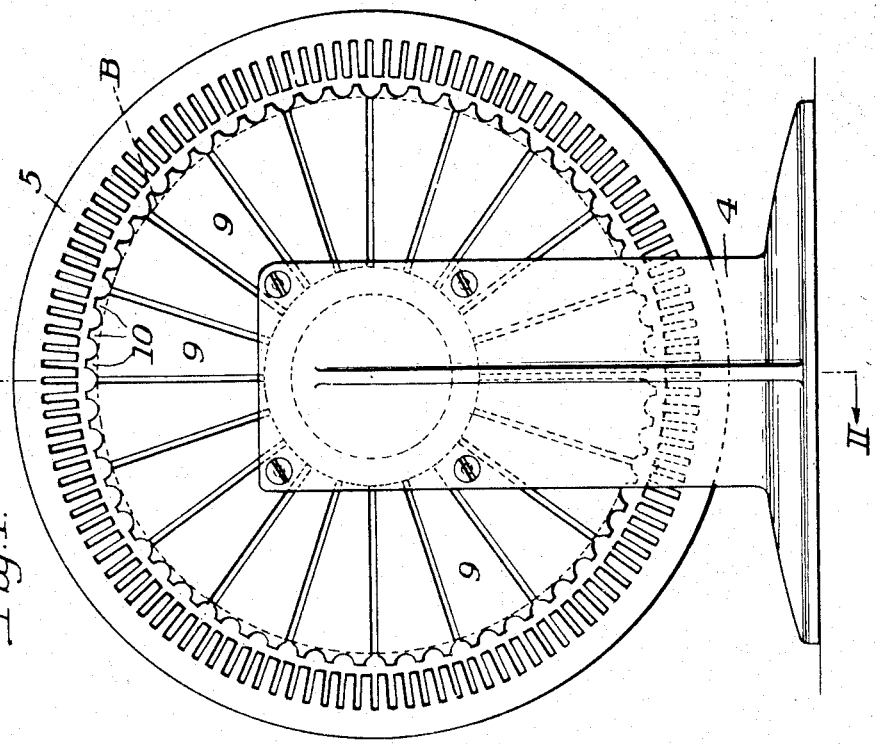
Inventor
Murray T. Swisher May 27, 1947.　　　M. T. SWISHER　　　2,421,301
SINGLE PHASE ALTERNATING CURRENT SYNCHRONOUS MOTOR
Filed March 15, 1944　　　2 Sheets-Sheet 2
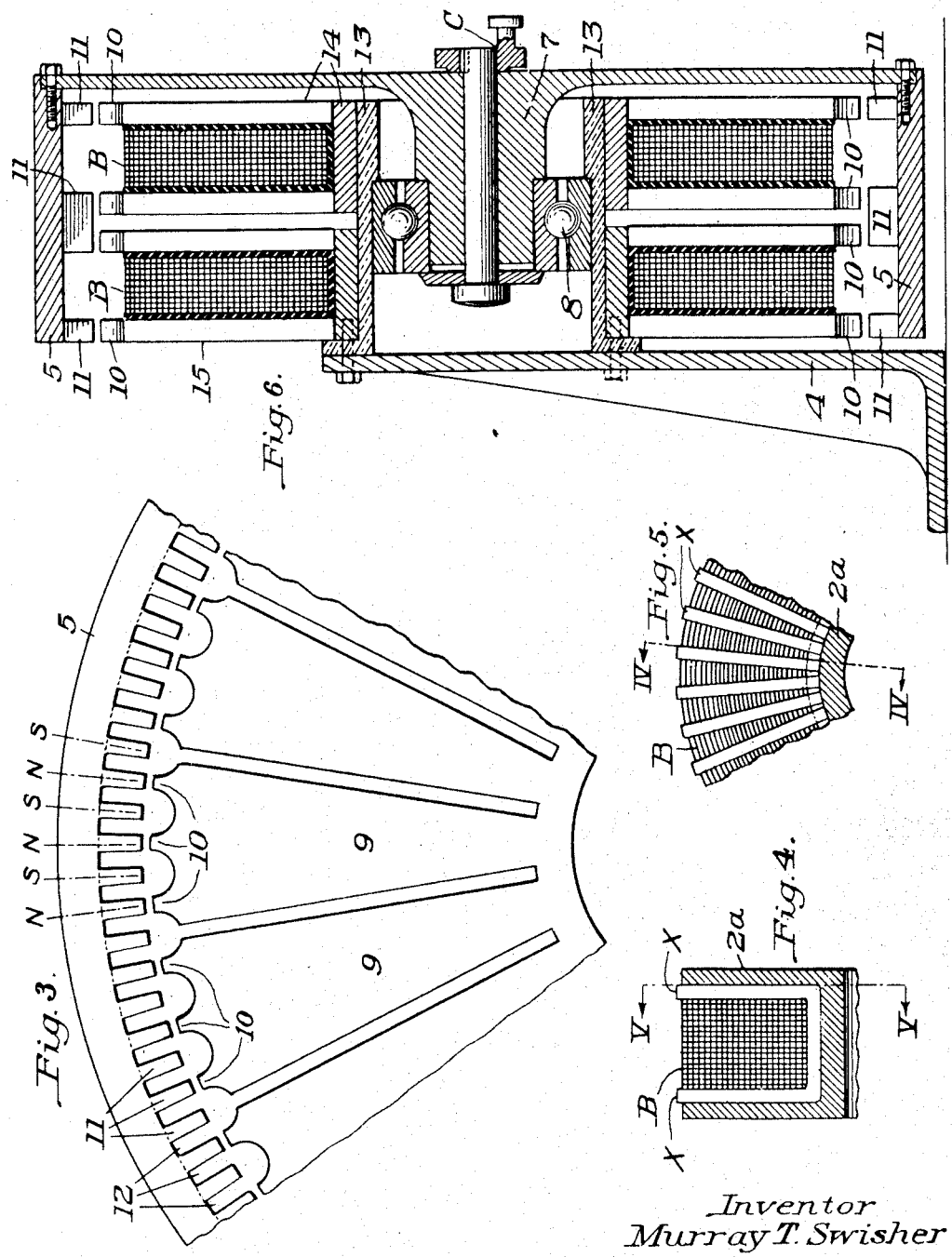
Inventor
Murray T. Swisher Patented May 27, 1947

2,421,301

UNITED STATES PATENT OFFICE 2,421,301

SINGLE-PHASE ALTERNATING CURRENT SYNCHRONOUS MOTOR

Murray T. Swisher, Clairton, Pa.

Application March 15, 1944, Serial No. 526,548

2 Claims. (Cl. 172—275)

This invention is an improvement in that class of electric machines of the inductor type, in which the stator and rotor elements are arranged in suitable relation for cooperative functioning whereby the rotor is utilized as an inertia element of the flywheel type, for efficient operation in driving connection with a synchronized controlled medium or element.

Specifically, it comprises a single phase alternating current synchronous motor, of the inductor type, designed to be used in connection with, for instance, an electric clock of the type identified in my copending application Serial No. 485,258. Other uses of course, are within the scope of its specific limitations as designed.

The motor is characterized by its facility to transmit reciprocating movement, by use of a pitman or equivalent gearing operated, as by a crank on the rotor element of the motor, synchronized with the driven element at suitable speeds, as sixty revolutions per minute.

The invention is particularly characterized by a novel arrangement of relative pole divisions or teeth on the stator and rotor members respectively, as shall be more fully hereinafter described.

Motors for such or other uses, of limited momentum at ultra-slow speeds, with the rotor surrounding the stator, of the flywheel type, provide increased momentum values, while allowing for minimum size construction. The invention is identified by utilization of an annular plurality of individually divided radial stator arms having terminal teeth, and surrounding teeth of the rotor, suitably spaced radially for air gap provision, such rotor poles having multiple relation to those of the stator.

While the invention is not limited to the specific construction and arrangement shown in the several embodiments illustrated, the relative arrangement of the stator arms and teeth, as disclosed, is maintained for best distribution of the energizing magnetic impulses.

Efficiency being imperative in ultra-slow speed motors, to effect this the stator and rotor is double, having two independent series of pole divisions or teeth. In each series all stator or energizing teeth when north magnetic poles, attract an equal number of south permanent teeth, they also repel an equal number of north permanent teeth, the order being reversed at each half cycle of the alternating current.

This is an advantage over a series having an equal number of stator and rotor teeth, wherein the stator teeth of a series all change from one polarity to the other at one time, for operation would depend on magnetic attraction of the energized teeth for the metal teeth alone, which do not have polarity, depending on momentum for advancement from tooth to tooth change over, in the neutral time of current between the alternations.

In arranging the stator and motor members, and their poles in relative position, adjustment of same permits of direct or reverse driving of the motor, as also in self starting, dependent upon such positioning, all as shall be more fully hereinafter described.

Referring to the drawings illustrating certain preferred constructions:

Fig. 1 is a face view of the machine, in elevation;

Fig. 2 is a transverse sectional view on the line II—II of Fig. 1;

Fig. 3 is an enlarged fragmentary detail view showing one preferred arrangement of stator and rotor pole elements;

Fig. 4 is a cross sectional detail view on the line IV—IV of Fig. 5, illustrating a modified arrangement of the stator pole elements;

Fig. 5 is a fragmentary sectional view on the line V—V of Fig. 4;

Fig. 6 is a view like Fig. 2 showing a modification involving plural side-by-side stator elements.

Wherever indicated, it will be observed that the teeth of the stator are indicated by the letter X, and those of the rotor, in plural alternating annular arrangement, by the letters N and S, respectively, indicating north and south permanent magnet teeth or poles.

As shown in Figs. 1 and 2, the stator frame is provided at terminal outer ends with the radially extending pole arms 9, between which is the cylindrical drum or barrel portion upon which is wound the winding B. The stator as thus, or otherwise made, is fixedly supported by any suitable standard 4, as in Figs. 1 and 2, sufficiently stable to maintain the stator in fixed relation to the surrounding rotatable rotor member 5.

As indicated in Figs. 1, 2, 3 and 6, the winding B of the stator is the induction coil, laid within the spaced arms 9. The terminals 10 of arms 9, in the simplest form, are annularly related to the several north and south poles N and S of the rotor 5, spaced apart as at 12, Fig. 3, and radially beyond teeth 10 with proper air gap, whereby to effect rotation of the rotor when energized by the stator windings.

The rotor 5 is rotatably mounted around the stator, as by an end plate or frame and a supporting shaft having ball bearing relation within the stator, and a terminal crank or pulley, generally disposed as in Fig. 5.

As shown in Figs. 1 and 2, the rotor is revolubly mounted for such accurate movement in fixed annular relation to the stator, by means of an inwardly extending stem or other extension 7, and intervening roller or ball bearing members 8 of well known construction. Any suitable power take-off, as crank C, or other gearing, may be used. The opposite face portions of the stator are radially divided into, for instance, twenty individual arms 9, divided by intervening radial slots, each arm terminating in individual teeth 10, for instance three for each arm.

Correspondingly, the alternating arrangement of north and south permanent poles or teeth 11 of the rotor, as in Fig. 3, extend inwardly in a double multiple, with the intervening radial spaces 12. These provide alternately spaced N and S pole terminals, extending inwardly to an exact extent for a proper working air gap range with relation to the teeth X, i. e. two for each of the teeth of the several arms 9.

As thus arranged it will be observed that the rotor has twice as many teeth as the stator, such being necessary, as all teeth on one end of the stator when north, must match an equal number of the alternately spaced south pole teeth respectively on the rotor. When all teeth on the same end of the stator are south, they thus have another corresponding duplicate set of north pole teeth on the other end.

It may be noted that no special process or method is required to magnetize such poles, as when the electric current is turned on the stator winding, and the rotor started, the poles of the rotor are automatically magnetized from the stator poles, or teeth, and are then alternately spaced permanent pole magnets. It will be understood also that the stator member requires but one simple winding, as on a spool, acting on the core of the stator.

I show in Figs. 4 and 5 a modified arrangement in which the stator ring 2a may be non-metallic, as of plastic or other insulating material.

In such construction the poles X of U-shape are inserted or cast within and between the sides of the ring, extending slightly beyond the ring perimeter, and embracing the winding B. The same spacing and relationship to the rotor N and S terminals existing, the same resulting reaction follows.

Inasmuch as all single phase motors having single windings are not self-starting, I show in Fig. 6 a further modified arrangement providing for same, utilizing a double stator winding i. e. two stator separated spool constructions, mounted on a single common sleeve as 13. In such arrangement I utilize two stator spools 14 and 15, one being adjustably mounted on sleeve 13, and one of such spools having a reverse winding.

Such reverse winding is necessary in order to provide the center poles of the same polarity, there being only a phase difference between them. Such phase difference is, obtained by what is known in the art as splitting the phase, accomplished by a resistance or condenser in one of the stator winding circuits. Such resistance or condenser may be external to the motor.

In such arrangement, it provides for adjustment of one spool slightly with relation to the other by annular rotation or shifting on the sleeve 13, dependent on the necessary relationship to the other spool. Thus in order to reverse the motor, one winding need not be reversed as ordinarily, as such would change the polarity of one of the center legs of the stator spools.

The necessary results may be accomplished either by cutting out the resistance or condenser from one circuit and inserting it in the other circuit, or by slightly shifting the one spool in the opposite direction.

From the foregoing alternative description it will be clear that the stator element of the motor is double, in that each is provided with two sets of poles, one set at each end. Also that its speed will be consistently accurate with the alternations of the electric current, as determined by the number of permanent magnets or poles on the rotor. Furthermore, no special process is required to magnetize the rotor poles, as when the current is turned on the stator winding, and the rotor is started, the poles of the rotor are magnetized from the stator poles.

The construction of the motor as a whole is extremely simple and comparatively inexpensive, as for instance in the one simple winding on the spool of the stator, acting efficiently on the stator core. Also, the rotor being provided with its greatly increased number of poles, in addition to its bywheel momentum, is susceptible of being driven at a desirably slow and controlled speed.

A further advantage in connection with the closely assembled series of U-shape double pole magnets of the stator, magnetized from one coil or winding, in comparison to usual plural windings, is in the resulting relatively low cost of construction.

It will be understood of course that a pulley, gear, or other suitable motion transmitting element may be substituted for the crank C. Also that the construction may be changed or modified to adapt it to various uses or otherwise, by the skilled mechanic or builder, within the scope of the following claims.

What I claim is:

1. In a motor as described, double stator construction comprising a pair of independent stator members having four series of 60 teeth, and a surrounding rotor member provided with three series of 120 inwardly disposed separated permanent magnet pole teeth.

2. In an alternating current synchronous motor, a supporting frame, a sleeve, two side by side stators mounted thereon having four series of 60 teeth each, a hardened iron rotor surrounding such stators, having outermost and middle elements comprising three internal equally spaced series of 120 teeth each, all supported by said frame having an end plate mounted on a bearing within the hub of the stators.

MURRAY T. SWISHER.

REFERENCES CITED

The following references are of record in the file of this patent:

UNITED STATES PATENTS

| Number | Name | Date |
| --- | --- | --- |
| 1,324,657 | Fosler | Dec. 9, 1919 |
| 1,440,729 | French | Jan. 2, 1923 |
| 1,791,149 | Sibley | Feb. 3, 1931 |
| 1,995,726 | Warren | Mar. 26, 1935 |
| 1,933,591 | Holtz et al. | Nov. 7, 1933 |
| 2,103,356 | Fisher | Dec. 28, 1937 |
| 440,699 | Dressler | Nov. 18, 1890 |
| 1,681,649 | Sibley | Aug. 21, 1928 |
| 1,842,966 | Gaubert | Jan. 26, 1932 |
| 2,070,447 | Morrill | Feb. 9, 1937 |
| 1,966,897 | Lofgren | July 17, 1934 |
| 2,081,993 | Beghardt et al. | June 1, 1937 |
| 1,935,208 | Hyadon | Nov. 14, 1933 |
| 2,245,577 | Deckman | June 17, 1941 |

FOREIGN PATENTS

| Number | Country | Date |
| --- | --- | --- |
| 474,918 | Great Britain | Nov. 10, 1937 |